(12) United States Patent
Bergman

(10) Patent No.: US 12,514,485 B2
(45) Date of Patent: Jan. 6, 2026

(54) APPARATUS AND METHOD FOR ASSESSING BALANCE

(71) Applicant: PERIMETER SECURITY INDUSTRIES PTY LTD, Fyshwick (AU)

(72) Inventor: Ian Bergman, Hornsby (AU)

(73) Assignee: Perimeter Security Industries Pty Ltd, Fyshwick (AU)

( * ) Notice: Subject to any disclaimer, the term of this patent is extended or adjusted under 35 U.S.C. 154(b) by 295 days.

(21) Appl. No.: 16/633,605

(22) PCT Filed: Jul. 26, 2018

(86) PCT No.: PCT/AU2018/050772
§ 371 (c)(1),
(2) Date: Jan. 24, 2020

(87) PCT Pub. No.: WO2019/018891
PCT Pub. Date: Jan. 31, 2019

(65) Prior Publication Data
US 2020/0390382 A1      Dec. 17, 2020

(30) Foreign Application Priority Data
Jul. 28, 2017   (AU) .................... 2017902981

(51) Int. Cl.
*A61B 5/00*       (2006.01)
*G01L 1/24*       (2006.01)

(52) U.S. Cl.
CPC .......... *A61B 5/4023* (2013.01); *A61B 5/6892* (2013.01); *G01L 1/242* (2013.01);
(Continued)

(58) Field of Classification Search
CPC ... A61B 5/0059; A61B 5/1036; A61B 5/4023; A61B 5/6892; A61B 2503/40; G01L 1/242; G01L 1/243; G02B 6/3608
See application file for complete search history.

(56) References Cited

U.S. PATENT DOCUMENTS 5,138,152 A * 8/1992 Botting ................ H04J 3/1676
250/227.16
5,338,928 A * 8/1994 Jamieson ............... G01B 11/18
250/227.21
(Continued)

FOREIGN PATENT DOCUMENTS

WO     WO-9322624 A1 * 11/1993 ............. A61B 5/113
WO     WO-2007135462 A1 * 11/2007 ........... A61B 5/4023
WO     2010/071926 A1     7/2010

OTHER PUBLICATIONS

Cantoral-Ceballos, Jose A., et al. "Intelligent carpet system, based on photonic guided-path tomography, for gait and balance monitoring in home environments." IEEE sensors Journal 15.1 (2014):279-289. (Year: 2014).*

(Continued)

*Primary Examiner* — Jennifer Robertson
*Assistant Examiner* — Nidhi N Patel
(74) *Attorney, Agent, or Firm* — Finch & Maloney PLLC

(57) ABSTRACT

An apparatus for assessing balance is described comprising a light source; a light guide; and a light detector. The light source is arranged to introduce light into the light guide; the light guide is arranged to be stood upon by a subject; the light detector is arranged to detect light emanating from the light guide to thereby facilitate an assessment of the balance of the subject standing upon the light guide.

4 Claims, 3 Drawing Sheets

(52) U.S. Cl.
CPC ............ *G01L 1/243* (2013.01); *A61B 5/0059* (2013.01); *A61B 2503/40* (2013.01)

(56) References Cited

U.S. PATENT DOCUMENTS

| | | |
|---|---|---|
| 2006/0278240 A1 | 12/2006 | Spillman, Jr. et al. |
| 2011/0249934 A1* | 10/2011 | Vey .................. G08B 13/186 385/13 |
| 2012/0070112 A1 | 3/2012 | Mitachi et al. |
| 2015/0364059 A1* | 12/2015 | Marks ................. A61B 5/486 482/9 |

OTHER PUBLICATIONS

Hata, Y. et al., "Home care system for aging people confined to bed by detached sensor network", InRobotic Intelligence in Informationally Structured Space (RiiSS), 2011 IEEE Workshop, Apr. 11, 2011, pp. 1-6 (Abstract).

POF Optical Force Plate, Balance Exercise, https://www.youtube.com/watch?v=Bulsib6qTx8, Nabeel Ahmed, Published Oct. 26, 2016.

Cheng C.H. et al., "Standing balance measurement system based on bend sensors using fiber Bragg gratings", Microwave and Optical Technology Letters, Oct. 2011, vol. 53, No. 10, pp. 2355-2359.

International Search Report Corresponding to PCT/AU2018/050772 mailed Oct. 9, 2018.

Written Opinion Corresponding to PCT/AU2018/050772 mailed Oct. 9, 2018.

\* cited by examiner

APPARATUS AND METHOD FOR ASSESSING BALANCE

TECHNICAL FIELD

The present invention relates to apparatus and methods for assessing balance, Embodiments of the invention find particular application in assessing the balance of people, but could also be used to assess the balance of animals.

BACKGROUND TO THE INVENTION

Balance refers to an individual's ability to maintain a particular stance. To remain standing requires ongoing and continuous postural adjustments. Tools to characterise the balance of an individual are used in a range of health and sports organisations for such purposes as falls risk assessment, concussion evaluation, neurological disease assessment and capabilities in sports requiring good balance.

Tools currently used include questionnaires; equipment with software to calculate movement of the subject's Centre of Pressure, including force plates and balance boards including the Nintendo Wii and devices based on the design of the Wii, and straps attached to the subject's torso with a pen which draw the sway patterns; and apps using accelerators in mobile phones.

The tools available to date either suffer from the problems of being expensive to produce, require specialised training in order to implement, or yield inconsistent results. There remains a need to provide improved apparatus and methods for assessing balance of a subject.

SUMMARY OF THE INVENTION

In a first aspect the present invention provides an apparatus for assessing balance including: a light source; a light guide; and a light detector; the light source is arranged to introduce light into the light guide; the light guide is arranged to be stood upon by a subject; the light detector is arranged to detect light emanating from the light guide to thereby facilitate an assessment of the balance of a subject standing upon the light guide.

The light source may be a light emitting diode.

The light guide may be an optical fibre which is convoluted in a substantially planar arrangement.

The optical fibre may be convoluted in a grid pattern.

The grid pattern may be a substantially orthogonal grid pattern.

The optical fibre may be embedded in a mat.

The light detector may be arranged to measure the intensity of light emanating from the light guide.

The assessment of balance may be based on variances in the output of the light detector over time In a second aspect the present invention provides a method of assessing the balance of a subject including the steps of: providing an apparatus according to the first aspect of the invention; directing the subject to stand on the light guide; and analysing the output of the light detector to thereby make an assessment of the balance of the subject.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
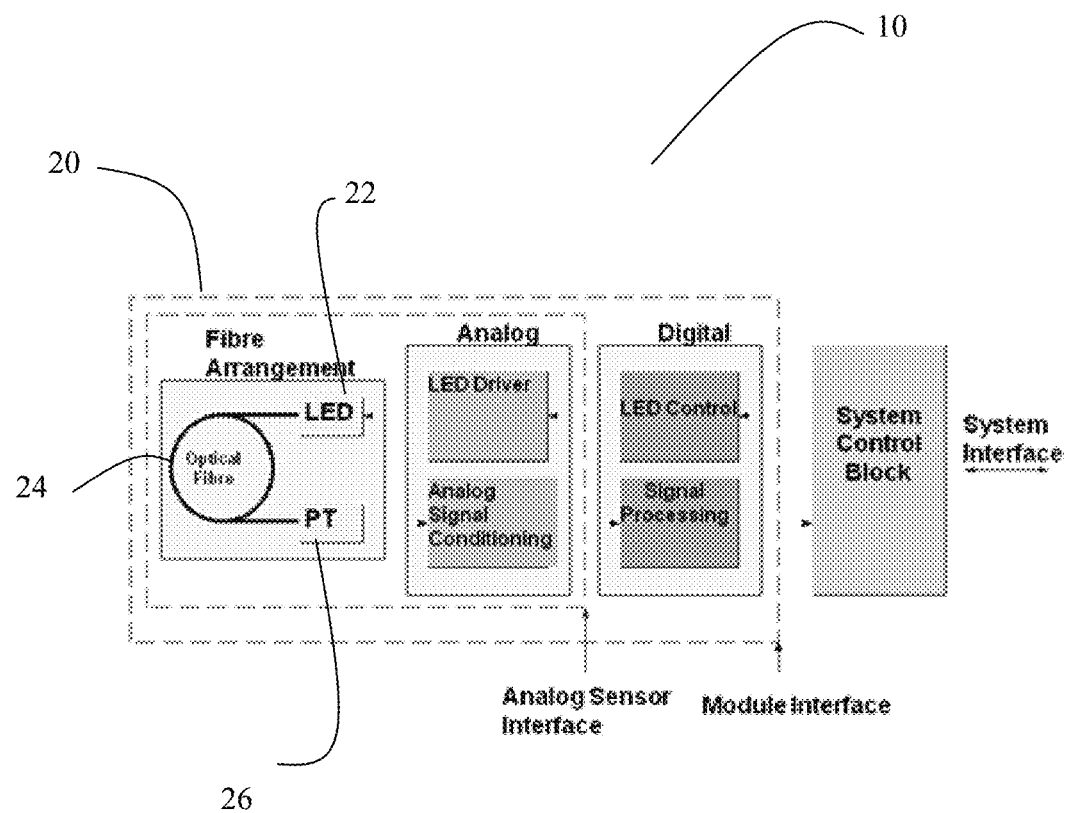
FIG. 1 is a schematic illustration of an apparatus for assessing the balance of a person.

Referring to FIG. 1, an apparatus 10 is shown for assessing the balance of a subject (being a person) including a light source in the form of a light emitting diode (LED) 22, a light guide in the form of a convoluted optical fibre 24 and a light detector in the form of a phototransistor 26. The optical fibre is convoluted and embedded in a mat 20.

The optical fibre used is a plastic optical fibre such as a polyethylene jacketed optical fibre cord. The optical fibre is convoluted and embedded in a mat type arrangement.

The optical fibre is sandwiched in a mesh between two pieces of adhesive polyethylene (PE) foam inside a mat which is laid on the ground for use.

Figure 2:
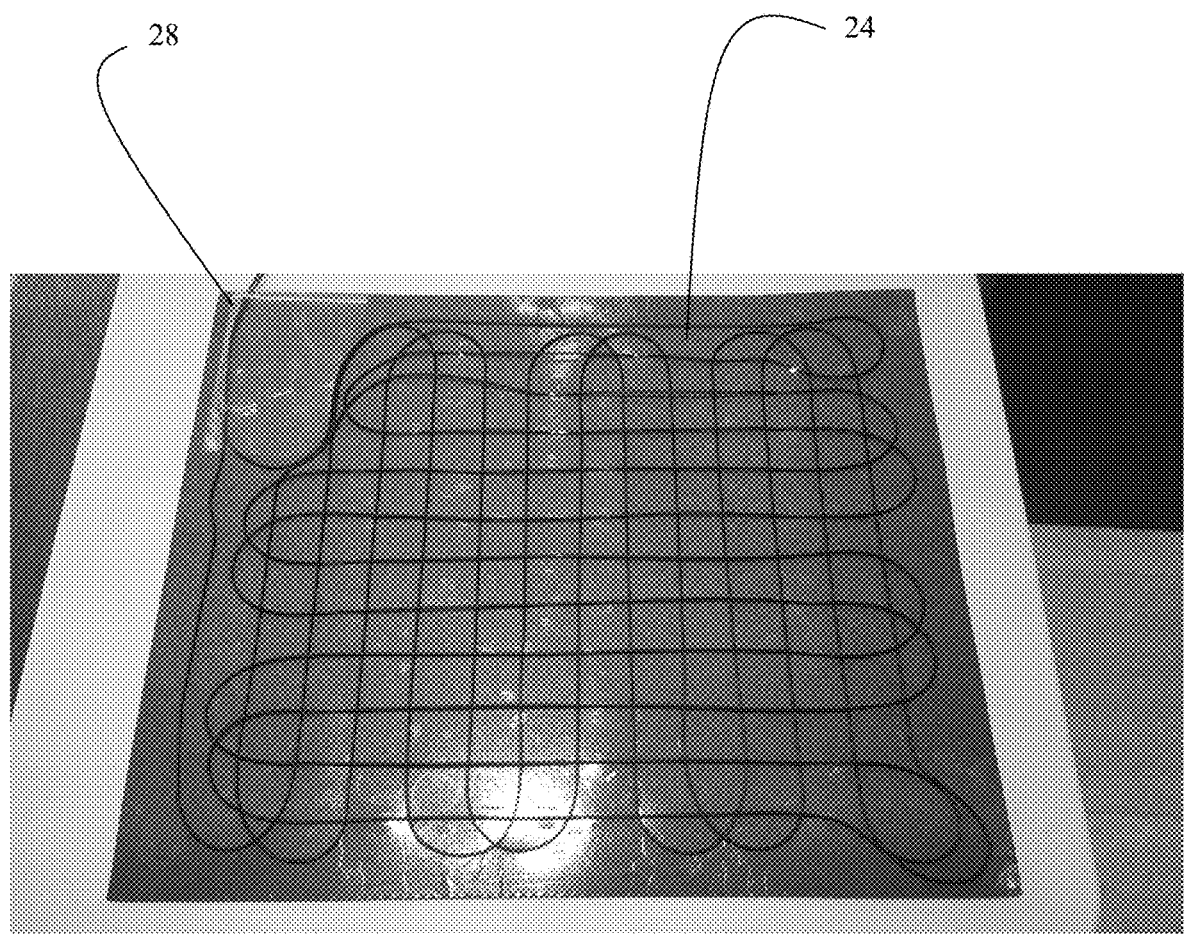
FIG. 2 shows a mat partially constructed to depict the pattern of the convolution of the optical fibre.

Referring to FIG. 2, a mat is shown part-way through construction to illustrate the convolution pattern of the optical fibre. The fibre is convoluted in a grid pattern woven in such a way that the bends are not too tight. A back and forth pattern is laid down first one way (East-West) followed by a subsequent layer of grid pattern oriented the other way (North-South). The fibres in the two layers are oriented substantially orthogonally to one another. The free ends of the fibre 28 are subsequently terminated by optical connectors in a known fashion.

Referring again to FIG. 1, the terminated ends of the optical fibre 24 connect to a small-sized electronic module which is housed at an edge portion of the finished mat. The module includes an analog stage and a digital stage. The analog stage drives the LED and receives an analog output voltage from the phototransistor. The module further includes a digital stage which controls the LED and processes the signal received from the phototransistor. The digital stage interfaces with a computing device, such as a laptop computer (not shown), by way of an RS485 interface and cable.

In order to assess the balance of a person the mat which contains the convoluted optical fibre is laid on the ground. The person is then directed to stand upright on the mat for a period of time (for example, one minute). The person is asked to try to maintain a static upright position and to move as little as possible during the test.

During the test the computing device receives and processes the conditioned output from the phototransistor. Over the period of one minute the output of the phototransistor is sampled 1200 times (20 times per second). Any large or small movements made by the person standing on the mat give rise to bending movements of the optical fibre which result in changes in the intensity of the light detected by the phototransistor and hence influence the output of the phototransistor. The variance of the output of the phototransistor over time is used as the basis for assessing the person's balance.

The laptop computer displays a graphical user interface which presents the variance in the output of the phototransistor over time as a number on a scale of 1 to 100 as a general indicator of a person's balance ability. The interface also allows the raw data (1200 data points) to be downloaded and analysed to allow for subsequent additional analysis of the test results if required.

Figure 3:
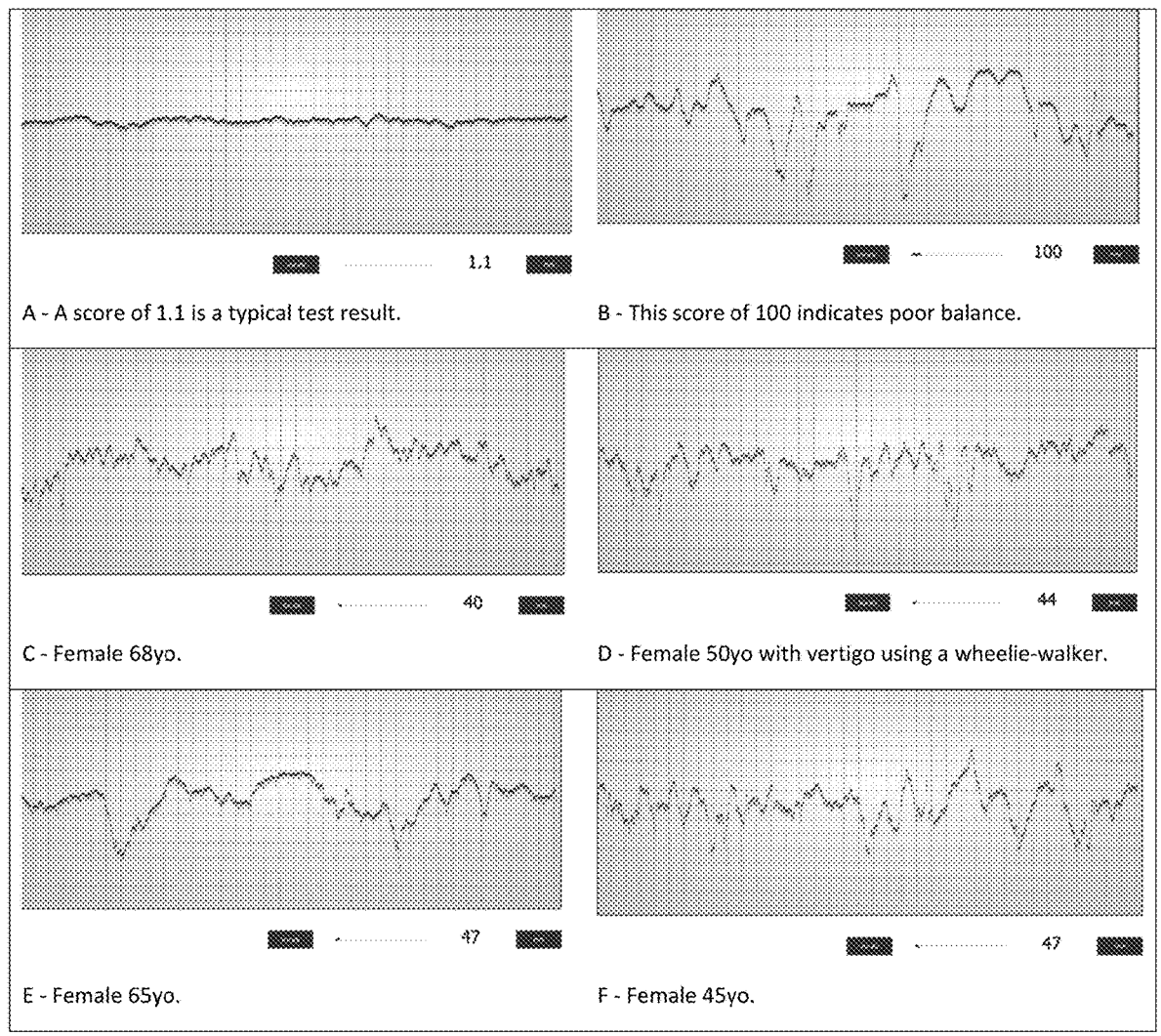
FIG. 3 shows examples of test results obtained h use of the apparatus of FIG. 1.

Referring to FIG. 3, several examples of the output displayed by the user interface at the conclusion of a test are shown. The vertical axis depicts variance and the horizontal axis depicts time:

- A—The first graph shows an example typical of the results for an individual with good balance with a typical variance score of 1.1.
- B—The graph with a score of 100 shows a pattern indicated by a person with serious difficulty maintaining their balance. The person who produced this result was visibly struggling to maintain their balance.
- C, D, E & F—These four graphs showing variance scores in the 40's are typical of people who make frequent small postural adjustments to maintain their balance.

By way of calculating a variance score, the system can consistently distinguish quickly and easily between people with good balance (variance scores of less than 1 are common) and people with poor balance. Having identified people with a 'balance problem' then the raw data can be analysed over multiple tests to gain further insight into the extent of the balance problem with a view to diagnosing the cause of the problem.

Although in the embodiment described above the electronic module in the mat was attached to a computing device by a cable, in other embodiments the mat may communicate wirelessly.

In the embodiment described above a light detector in the form of a phototransistor was utilised. In other embodiments other types of components may be used such as a light dependent resistor.

The apparatus and method can be used in many different areas such as in aged care for Falls Risk Assessment; concussion testing in sport; a mat with a single footstep for use in Yoga classes; and use in rehabilitation to monitor the progress of patients undergoing therapy.

Although the embodiment described above was described in use to assess the balance of people, other types of subjects may be assessed such as animals.

It can be seen that embodiments of the invention have at least one of the following advantages:

- A typical subject may have a balance disorder or a potential balance problem. The arrangement of the optical fibre convoluted in a mat has a very low profile and is easy for test subjects to step onto and off, facilitating ease of use by subjects who can feel secure whilst undergoing testing.
- The apparatus is light weight and easily portable and can be used on any flat surface.
- The apparatus is of simple and durable construction and provides consistent test results from one test to another.
- No specialised training is required in order to use the apparatus or method.
- The testing methodology used requires very little cooperation or effort on the part of the test subject and can be conducted quickly and easily in any location.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A method of assessing a balance of a subject including the steps of:
   providing an apparatus including:
      a light source in the form of a light emitting diode;
      a light guide in the form of a single optical fibre which is convoluted in a substantially planar arrangement; and
      a light detector in the form of a phototransistor;
      the light source is arranged to introduce light into the light guide;
      the light detector is arranged to detect light emanating from the light guide;
   the method further including the steps of:
      directing the subject to stand on the light guide; and
      wherein the light detector is arranged to measure an intensity of light emanating from the light guide,
      analyzing output of the light detector to thereby make an assessment of the balance of the subject, analysis of the output of the light detector is initiated once the subject is standing on the light guide; the step of analyzing the output of the light detector includes analyzing variances in the output of the light detector over a period of time the subject is standing on the light guide; and
      the variances of the output of the light detector over the period of time are used as the basis for assessing the balance of the subject; and
      calculating and outputting a variance score which is a measure of balancing ability of the subject.

2. The method according to claim 1 wherein the optical fibre is convoluted in a grid pattern.

3. The method according to claim 2 wherein the grid pattern is a substantially orthogonal grid pattern.

4. The method according to claim 1 wherein the optical fibre is embedded in a mat.

* * * * *